(No Model.) 2 Sheets—Sheet 1.
H. C. BEHR.
VARIABLE TRANSMITTING GEARING.
No. 491,866. Patented Feb. 14, 1893.
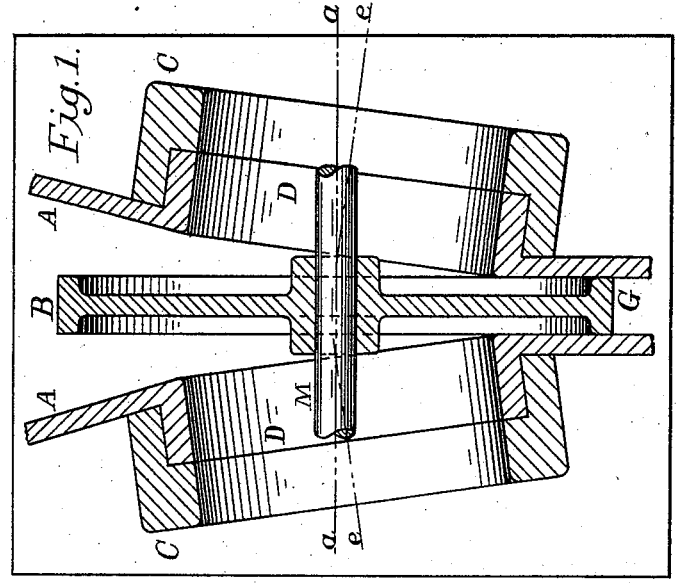
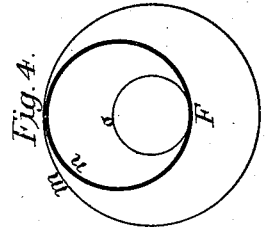
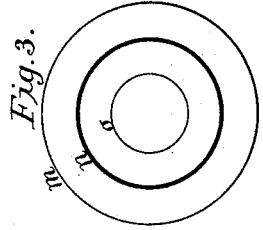
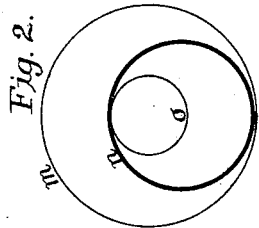
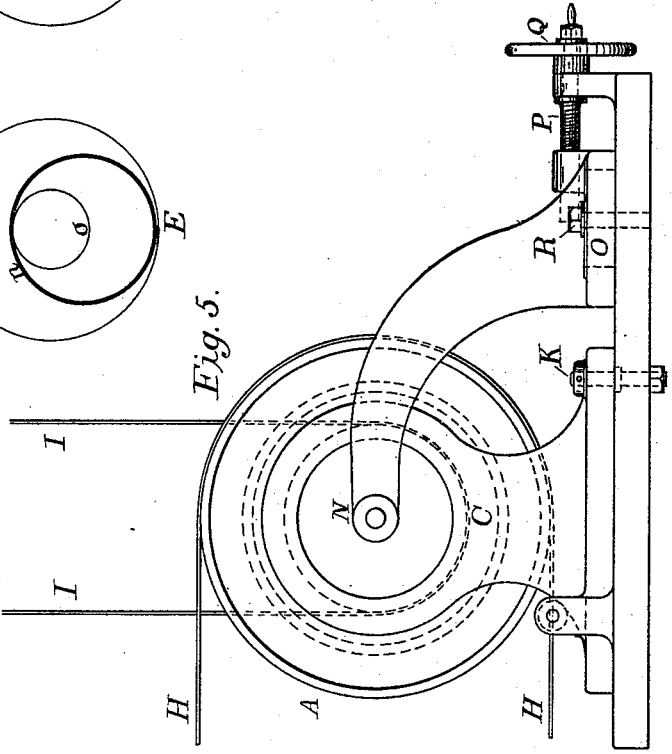
Witnesses.
S. Lucien Berry.
Wilson D. Bent Jr.
Inventor.
Hans C Behr
By his Atty
John Richards (No Model.) 2 Sheets—Sheet 2.

H. C. BEHR.
VARIABLE TRANSMITTING GEARING.

No. 491,866. Patented Feb. 14, 1893.

Witnesses.
S. Lucien Berry.
Wilson D. Best Jr.

Inventor.
Hans C. Behr
By his Att.
John Richards

UNITED STATES PATENT OFFICE.

HANS C. BEHR, OF SAN FRANCISCO, CALIFORNIA.

VARIABLE TRANSMITTING GEARING.

SPECIFICATION forming part of Letters Patent No. 491,866, dated February 14, 1893.

Application filed April 21, 1892. Serial No. 430,028. (No model.)

*To all whom it may concern:*

Be it known that I, HANS C. BEHR, a citizen of the United States, residing in the city and county of San Francisco, State of California, have invented certain new and useful Improvements in Variable Transmitting Gearing; and I hereby declare the following description and drawings to constitute a full, clear, and exact description of my invention.
My invention relates to that class of gearing employed to produce a differential or varying rate of movement between two shafts, or rotating parts of a machine, by adjustment, or as may be determined by a variable force, and is applicable to instruments for indicating or recording the difference of movement between two shafts, or of producing such difference of movement, as in the case of instruments for measuring or recording power, variably feeding machine tools, wood-working, or other machines.

My invention consists of frictional disks, or wheels, bearing upon their sides and in the plane of rotation, so mounted that the path of rotation of both the driving and driven elements are at the point of contact as nearly coincident as possible and therefore rotate together by virtue of nearly perfect rolling friction of the driving surfaces; also in providing the driving disks, or wheels, with annular bearings surrounding the axis of the driven disk, or wheel, so that the axis of both may be approximately in the same line or will deviate as little as possible therefrom, in the range of adjustment for which the gearing is adapted.

The object of my invention is to attain as nearly as possible a coinciding movement of the driving frictional surfaces of such gearing, at the point of contact, and thus avoid the wear of such surfaces caused by excessive sliding of one upon the other, the only appreciable sliding being that caused by adjustment of relative rotation.

Figure 6:
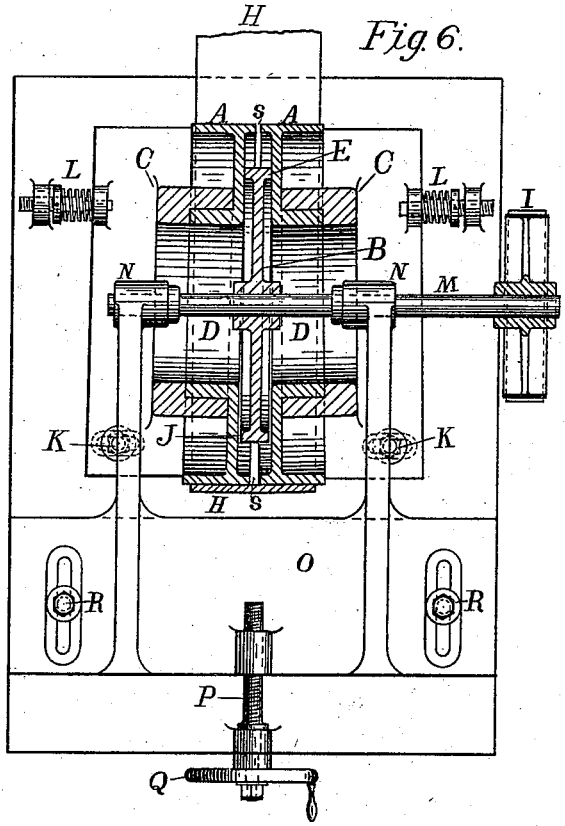
Figure 7:
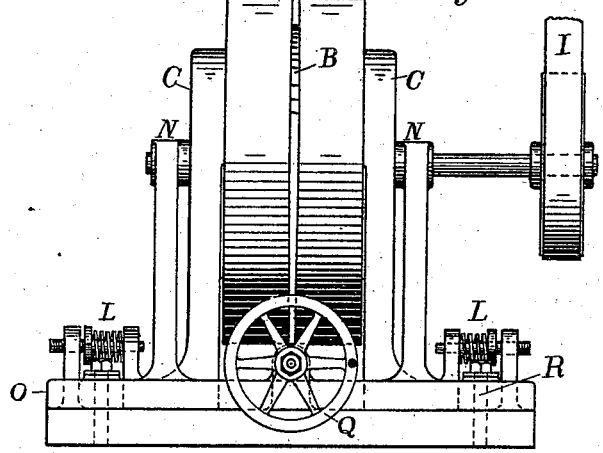

In the drawings employed to illustrate my invention, Figures 1, 2, 3 and 4 are diagrams employed to show the manner of its operation. Fig. 5 is a side view of an apparatus for transmitting motion differentially, according to my invention. Fig. 6 is a plan view of the same, partially in section, and Fig. 7 is an end view of the same apparatus.

Similar letters of reference are employed on the different figures to indicate corresponding parts thereof.

Referring first to Figs. 1, 2, 3 and 4: In Fig. 1, A A are the driving elements, and B is the driven one. *a a* is the line of the axis of the driven element B, and lines *e e* the axes of the driving elements A A, the divergence of these lines being exaggerated in the present case to more clearly show the nature of my invention. The driving elements A A are mounted in and revolve in the supports or bearings C C, the journals D D being hollow and large enough to permit within them a lateral adjustment of the wheel B and its axis *a a*, as shown in Figs. 2, 3 and 4, in which the circles *m* and *o* represent the outer and inner edges of the driving element A A, and the circles *n*, the driven, or adjustable element B.

In Fig. 2 the driven element B is adjusted so that the point of frictional contact at E, corresponding to G in Fig. 1, is on the end faces of element B, and so that the movement on the circles *m* and *n* will be in proportion to their circumference, or as their diameters relatively.

In Fig. 3 the driving and driven elements are concentric, both moving at the same rate of rotation.

In Fig. 4 the element B, represented by the circle *n*, is removed to the other extreme, so that the point of frictional contact at F is brought upon the inner circle *o*, and the relative rate of rotation between the circles *o* and *n*, or the elements A A and B will be in the proportion that the circle *o* bears to the one *n*. It will be understood, that the extreme of variation between the driving and driven elements depends upon the proportion of the various parts, and is as the variation between the points E and F; also, that the terms "driving" and "driven" employed here for convenience, can be changed, the member B driving A A, instead of the reverse, as has been described.

Referring now to Figs. 5, 6 and 7, these represent a practical application of my invention for varying the speed between two machines, or shafts, connected to the apparatus by the belts H and I, respectively. The disks, or wheels A A, are both driven uniformly by a belt H, or in any other suitable manner. The disks are provided with hollow annular bearings D, supported loosely in the standards, or brackets C C, but with their axes forming a slight angle with each other, as shown by the different spaces s s, between the rims in Fig. 6. This angular position is only enough to insure pressure at E on the ends of the rim of the wheel B, and to avoid contact at J with the end faces of wheel B on its opposite side. The brackets, or standards C are pivotally supported at K K, and are pressed inward by adjustable coil springs L L, so as to cause the disks A to bear at E upon the driven disk B with such force as the amount of power transmitted may require. The journals D D of the disks A are made hollow as shown, with their internal diameters large enough to permit a lateral adjustment of the axis M of the disk B to such extent as the variations of relative speed may require. The shaft, or spindle M, has bearings N N connected to the adjustable plate O, so that the whole can be adjusted forward or back by means of a screw P and hand-wheel Q, and thus shift the disk B to the positions shown in the diagrams, Figs. 2, 3 and 4, or any intermediate position between these points. The plate O moves on the slots and screws R, and can be fixed at any point by means of these screws. The disks A A can be driven by a belt, as shown, or by means of gear-teeth formed on their periphery, or the disk B may become the driving one, and the two A A be the driven.

Having thus described the nature and objects of my invention, what I claim as new and desire to secure by Letters Patent, is

1. A differential transmitting gearing, consisting of a driven element having an axis, a pair of driven disks between which the driven element is located, said disks being provided with hollow journals supported loosely in standards, said journals having an internal diameter large enough to permit a lateral adjustment of the axis of the driven element to such an extent as the variation of relative speed may require, and the axes of the disks forming an angle with each other, all of said parts being arranged so that there may be a pressure between the disks and the rim of the driven element, at a point on one side of of the axes, substantially as described.

2. A differential transmitting gearing, consisting in the combination of a wheel B, having an axis M, a pair of disks A A, between which the wheel B is located, said disks A A being provided with hollow journals D supported loosely in the standards or brackets C C, the axes of the disks A forming an angle with each other, said angular position being only sufficient to insure pressure at a point, as E, on one side of the axis and avoid contact at a point, as J, on the opposite side of the axis, said journals D having an internal diameter large enough to permit a lateral adjustment of the axis M, to such extent as the variations of relative speed may require, and the springs for the purpose of permitting varying degrees of pressure between the frictional driving surfaces, substantially as described.

In testimony whereof I have hereunto affixed my signature in the presence of two witnesses.

HANS C. BEHR.

Witnesses:
ALFRED A. ENQUIST,
WILSON D. BENT, Jr.